United States Patent [19]

Berger

[11] Patent Number: 5,438,225
[45] Date of Patent: Aug. 1, 1995

[54] SOLAR POWERED ANNUCIATOR

[75] Inventor: Walter R. Berger, Houston, Tex.

[73] Assignee: Murphy Management Inc., Tulsa, Okla.

[21] Appl. No.: 98,257

[22] Filed: Jul. 29, 1993

Related U.S. Application Data

[63] Continuation of Ser. No. 832,122, Feb. 6, 1992, abandoned.

[51] Int. Cl.[6] .............................................. H02J 7/34
[52] U.S. Cl. ........................................ 307/66; 307/87; 320/56
[58] Field of Search .................................. 307/64-66, 307/72, 75, 76, 80, 81, 85, 86, 87, 23; 323/906; 136/293; 320/48, 56; 340/517, 521, 802

[56] References Cited

U.S. PATENT DOCUMENTS

| | | | |
|---|---|---|---|
| 3,222,535 | 12/1965 | Engelhardt | 307/66 |
| 3,264,613 | 8/1966 | Stolle | 340/517 |
| 3,893,014 | 7/1975 | Vacek | 307/76 X |
| 3,965,469 | 6/1976 | Ryan | 340/520 |
| 3,980,996 | 9/1976 | Greenspan et al. | 320/1 X |
| 4,074,255 | 2/1978 | Munt | 340/756 |
| 4,136,660 | 1/1979 | Palmer et al. | 123/198 DC |
| 4,164,145 | 8/1979 | Aron | 73/293 |
| 4,165,477 | 8/1979 | Comte | 320/61 |
| 4,245,493 | 1/1981 | Beeghly | 307/66 |
| 4,323,894 | 4/1982 | Wood et al. | 340/764 |
| 4,336,463 | 6/1982 | Beeghly | 307/66 |
| 4,523,460 | 6/1985 | Strickler et al. | 73/200 |
| 4,681,515 | 7/1987 | Allen | 417/218 |
| 4,827,206 | 5/1989 | Speas | 323/906 X |
| 4,827,246 | 5/1989 | Dolan et al. | 323/906 X |
| 4,843,525 | 6/1989 | Williams | 362/157 |
| 4,888,702 | 12/1989 | Gerken et al. | 320/40 |
| 4,963,811 | 10/1990 | Weber | 307/66 |

OTHER PUBLICATIONS

Frank W. Murphy Mfr., Selectronic Tattletale: Specifications, Operations and Maintenance Manual Jan. 1, 1986.
Rony, Peter R.; "Logic and Memory Experiments Using TTL Integrated Circuits"; Book 2; Sams and Co, Inc.; Indianapolis, Ind.; 1979; pp. 165, 168, 169.

Primary Examiner—A. D. Pellinen
Assistant Examiner—Fritz M. Fleming
Attorney, Agent, or Firm—Mark Ungerman

[57] ABSTRACT

A combination shut-down trigger and annunciator may be advantageously powered by a photoelectric power supply. The shut down trigger and annunciator can include a fault detection unit responsive to a plurality of fault condition sensor inputs. A fault condition identification storage element is connected to the fault detection unit and a display is connected to the fault condition identification storage element. The photoelectric power supply is then connected to the fault condition identification storage element. The photoelectric power supply may be provided with a battery backup system for use when there is insufficient light incident on a photo cell to power system. The battery backup may be a rechargeable battery in the power supply can include a battery charger. The configuration of the power supply, including the photocell battery charger and backup battery allows the system to operate without drawing power from an engine CD ignition power supply.

21 Claims, 5 Drawing Sheets

SOLAR POWERED ANNUCIATOR

This is a continuation of application Ser. No. 07/832,122 filed Feb. 6, 1992.

BACKGROUND OF THE INVENTION

1. Field of the Invention

The invention relates to an annunciator device and more particularly an annunciator device which utilizes solar power to reduce or eliminate the necessity to draw power from external devices.

2. Description of the Related Technology

The annunciator and shutdown systems have many applications and may be used in connection with the control and/or protection of remotely located internal combustion engines. Such remote internal combustion engines are prevalent in oil field and pipeline applications for power and pumping stations. In such locations, there may not be a readily available electric power supply. Known annunciators such as that described in U.S. Pat. Nos. 4,246,493 and 4,336,463, expressly incorporated by reference herein, utilize a battery power supply in combination with a Capacitor Discharge (CD) ignition power supply. The ignition power supply operates during normal operation of the engine and a battery power supply delivers power to only a portion of the annunciator system when the engine is not operating.

All CD ignition powered annunciators have a significant drawback. The annunciator places a load on the CD ignition power supply, thereby reducing its energy level. In the field the CD ignition systems are often only marginally able to supply power to spark the engine and can ill afford the drain or load of an annunciator.

Annunciator and shutdown systems are important control features of remote engines. The annunciator monitors a plurality of parameters including oil pressure, temperature and other critical operational parameters. If one of these parameters is out of range, the monitoring circuitry of the system triggers the shutdown of the engine and displays the fault condition, generally according to a sensor number.

SUMMARY OF THE INVENTION

It is an object of the invention to provide an annunciator system which can operate for a long period of time under adverse conditions and without any external power drain or power system service requirements such as battery replacement. This object may be attained by an annunciator system which is primarily powered by solar energy. The solar energy is advantageously connected to a back-up battery which may be a lithium battery. According to a preferred configuration, the system is made up of a segregated annunciator unit and a power supply and shutdown unit. Arrangement in two units is particularly advantageous in hazardous areas such as Class I Div. 1 applications. The power supply unit is advantageously mounted in an explosion-proof box with a window for a photovoltaic cell. The power supply is advantageously connected to the annunciator unit by a shielded cable. The power supply unit may also be provided with connections for remote power supplies such as a remote photovoltaic cell or magnetic or inductive power supplies.

For non-hazardous applications, all the components may be mounted in a single housing. The annunciator unit includes electronic circuitry, sensor switch terminals for monitoring sensors and push buttons and display or other operator interfaces. The power supply unit components include a photovoltaic panel, a back-up battery, a battery charging circuit and alarm and shutdown inputs.

According to the invention, the shutdown trigger and annunciator may be made up of a fault detection unit which is responsive to a plurality of fault sensor inputs. A fault condition identification storage element is advantageously connected to the fault detection unit. According to one configuration, the fault detection unit can output a first signal indicative of a sensor scan and a second signal identifying a fault condition. Upon indication of a fault condition, the sensor identification may be stored in memory or latched into a register. The fault condition identification is then delivered to a display. Advantageously, a photoelectric power supply is connected at least to the fault condition identification storage element.

The photoelectric power supply may also be connected to supply all the components of the annunciator and shutdown system.

According to an advantageous embodiment, an activator is provided to trigger some action on detection of a fault. The action triggered would be to shut down an internal combustion engine by cutting off the fuel supply and/or shorting the ignition. Furthermore, the activator may set an alarm indicating a fault or shutdown.

The photoelectric power supply may be made up of a photovoltaic or solar cell which is connected through a battery charger to a rechargeable battery. The power supply can include a voltage regulator, featuring an appropriate voltage output level. The rechargeable battery powers the system when there is insufficient voltage levels generated by the photo cell.

The annunciator system may also include a remote power supply connected to the photoelectric power supply. The remote power supply may be a secondary or remote photoelectric generator, a magnetic pick-up power supply, a thermocouple or thermopile.

According to a further feature of the invention, the auxiliary power supply which may be a CD ignition power supply of an internal combustion engine. The use of energy from the CD ignition power supply may be controlled by a voltage sensor which determines when the voltage level of the primary power supply falls below a predetermined level.

According to a further advantageous feature of the invention, the annunciator may be connected to a remote communication channel. The fault alarm and/or volt identification information may be transmitted over the remote communication channel.

The system according to the invention may be implemented using a conventional microprocessor programmed to carry out operations corresponding to the components described herein.

Further developments and features will become apparent from the detailed description of the preferred embodiment and the drawings.

BRIEF DESCRIPTION OF THE DRAWINGS

FIG. 4, composed of FIGS. 4A and 4B, shows a schematic diagram of the annunciator section according to an embodiment of the invention.

DETAILED DESCRIPTION OF THE PREFERRED EMBODIMENT

According to the invention, the annunciator may be implemented as a 32-channel multiplexer having data inputs for 32 sensors or switches. A switch may assume a number of the associated input channel. A tripped sensor may appear as a digital input to a multiplexer input line. The multiplexer sequentially scans the 32 input channels. According to the preferred embodiment, each sensor input may be scanned once every half second. In such a configuration any tripped sensor will be detected within a half second of being tripped.

Whenever a tripped sensor is detected, the signal is transferred by the multiplexer to an input register as a fault signal. The fault signal will set the register which then sends a signal to the power supply to turn on the shutdown and alarm output. Simultaneously, the input register may strobe a sensor number, stored in a channel number counter into a seven-segment display register. The sensor number may then be displayed on a liquid crystal or other display in a sensor-number window. The sensor number is advantageously retained in the display and the remaining sensor inputs may be disabled until the annunciator is manually reset.

A start-run timer power circuit within the annunciator allows time for the controlled system to come up to speed without being shut down by speed-dependent conditions. This is particularly important in the case of the internal combustion engine which requires time to build-up certain detected levels on start-up such as oil pressure. The timer may be initiated by the reset button. Initiation of the time period may be indicated in a start-run timer window of the display. As the start-run time elapses, the timer may count down to zero. A plurality of rocker switches may be provided to configure the sensor inputs for timed or non-timed inputs.

According to an advantageous feature, the system may have a test mode. In the test mode, the start-run timer provides a lock-out for the shutdown function so that all sensors may be tested. In this mode, the timer enables all sensors to be successively tripped and displayed in the sensor number display window while inhibiting shutdown due to tripped sensors until the time zero. The test function operates only after the system is started and up to speed. The system cannot be put in test mode until the run signal is received. This prevents start-up in test mode.

Pressing the test push button sets the unit into a test mode for the start-run timer. This mode may be indicated by a colon in the sensor timer window. In test mode, a shutdown function is locked out so that each sensor may be tested without shutting down the system. The same sensor may be tested without shutting down the system. Thus, each sensor may be tripped as the annunciator indicates the sensor number in the sensor number window.

After each sensor is tripped, the unit may be reset by a reset push button. Each time the reset button is pressed, the timer count restarts at full count. The test ends when the timer counts down to zero or when the operator zeroes the timer by pressing a timer zero button. By forcing the timer to a zero count the test function may be terminated.

According to the invention the annunciator power supply is a photocell. The photo cell is connected with a battery to provide power even if insufficient light is incident on the cell. A charger may be connected to the cell in order to charge the battery during lit periods.

According to an advantageous feature, the annunciator may switch to ignition power whenever the battery is discharged below a predetermined level. An advantageously predetermined level may be set at 4.2 volts. According to the preferred embodiment, this level may be as low as 3.0 volts and operates effectively at 4.2 volts.

According to the preferred embodiment, the power supply section or unit provides the operating voltage to the annunciator and shutdown control circuits within the power supply. The power is primarily supplied by a 15-volt 14.5 milliamp photovoltaic panel or by a magnetic pickup with a 6-volt DC secondary lithium cell battery for backup power. When fully charged, the battery capacity is sufficient to stay in operation for a period of 150 hours. If, the battery voltage drops below 4 volts DC, the system may switch to the ignition system for secondary backup power. When battery voltage is above 4 volts DC, the ignition input is switched off and no current is drawn from the ignition system to the annunciator system. This allows the ignition system to operate at maximum efficiency with no current draw from the ignition system to the annunciator and shutdown system. The photovoltaic panel may be sized to provide sufficient energy to power the annunciator and charge the battery even on a generally rainy day.

Shutdown and alarm outputs may turn on when the annunciator detects a faulted sensor. These outputs are typically used to trip a fuel gas shutoff valve and/or to ground the ignition of an internal combustion engine whenever a fault is detected.

An ignition ground delay is advantageously provided in order to give the engine time for a fuel gas valve to be tripped and the engine to exhaust its remaining fuel supply prior to shorting the engine ignition. According to an advantageous feature, the ignition ground delay may be three to five seconds.

According to an advantageous feature, protective barriers may isolate the low-energy output from the high-energy supply circuits. Safety barriers in the system prevent any normal or abnormal power supply input from being transferred to the annunciator section, thus maintaining the intrinsic safety of the annunciator section.

The ignition input may turn on an ignition run switch. The ignition run switch enables the annunciator multiplexer channel scan sequence and allows the annunciator to monitor sensor inputs. It also enables the annunciator test function.

Figure 1:
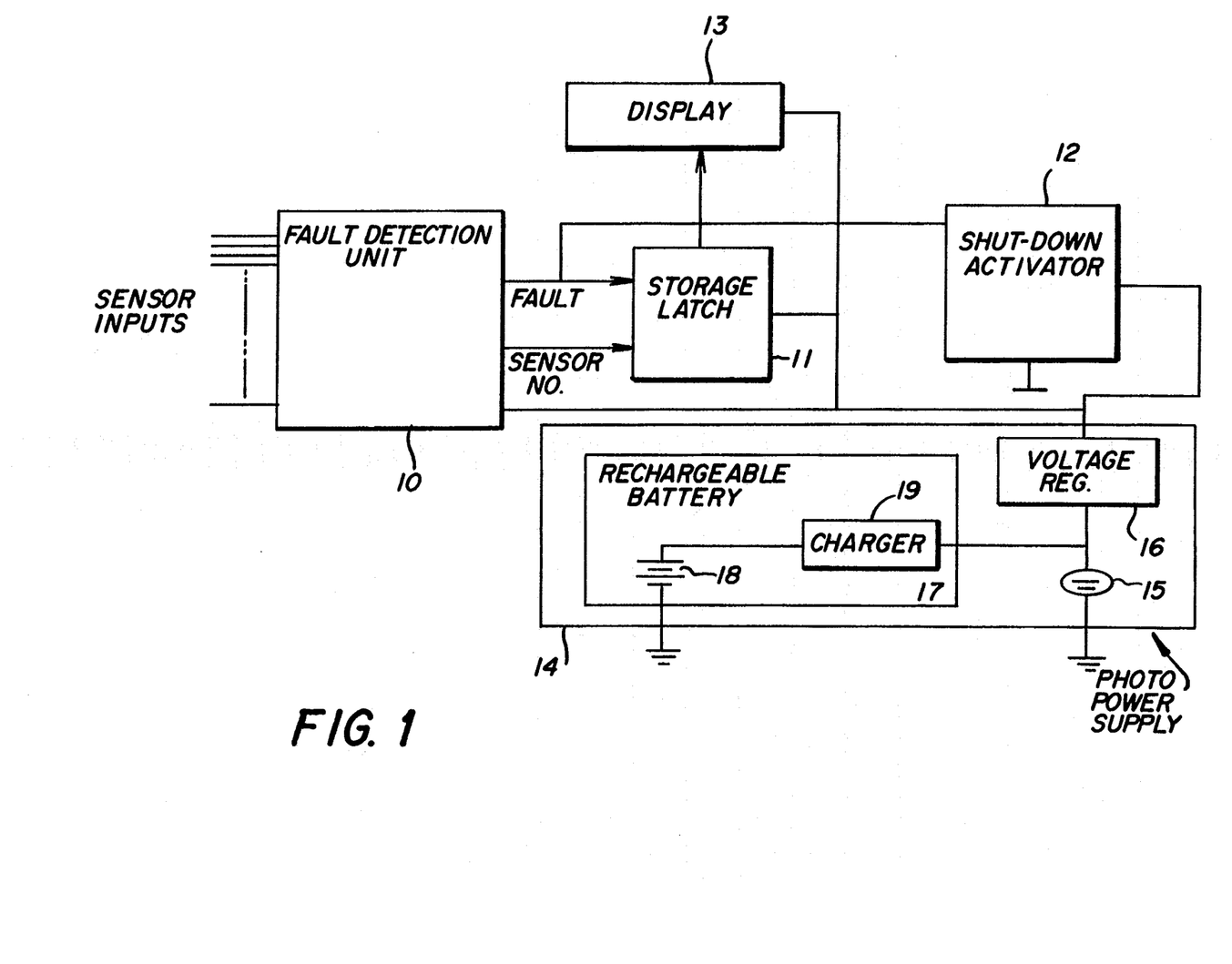
FIG. 1 shows a simplified block diagram of a shutdown and annunciator system according to the invention.

FIG. 1 shows a simplified block diagram of the system according to the invention. The shutdown trigger and annunciator system includes a fault-detection unit 10 which scans a plurality of sensor inputs in order to identify a fault condition. Upon detection of a fault condition, a fault condition indication is transmitted to a fault condition identification latch 11 and a shutdown activator 12. The fault detection unit also transmits a sensor identification signal to the fault condition identification storage element 11. Upon receipt of the fault condition signal, the fault condition identification storage element saves the fault condition identification signal and outputs the signal to a display 13. Upon detection of a fault, a shutdown activator effects a desired activity The activator may include an alarm signal generator, a fuel cutoff signal and/or an ignition short circuit.

The system also includes a photo power supply 14 with a photovoltaic cell 15. A photo power supply delivers operating power to the fault detection unit 10, the fault condition identification storage element 11, the shutdown activator 12, and the display 13. A photo power supply advantageously includes a voltage regulator 16 connected to the photovoltaic cell. A rechargeable battery power supply 17 is provided as a backup to the photovoltaic cell for use when there is insufficient solar radiation incident against the photo cell to operate the system. A rechargeable battery power supply includes a battery 18 and a battery charger 19.

Figure 2:
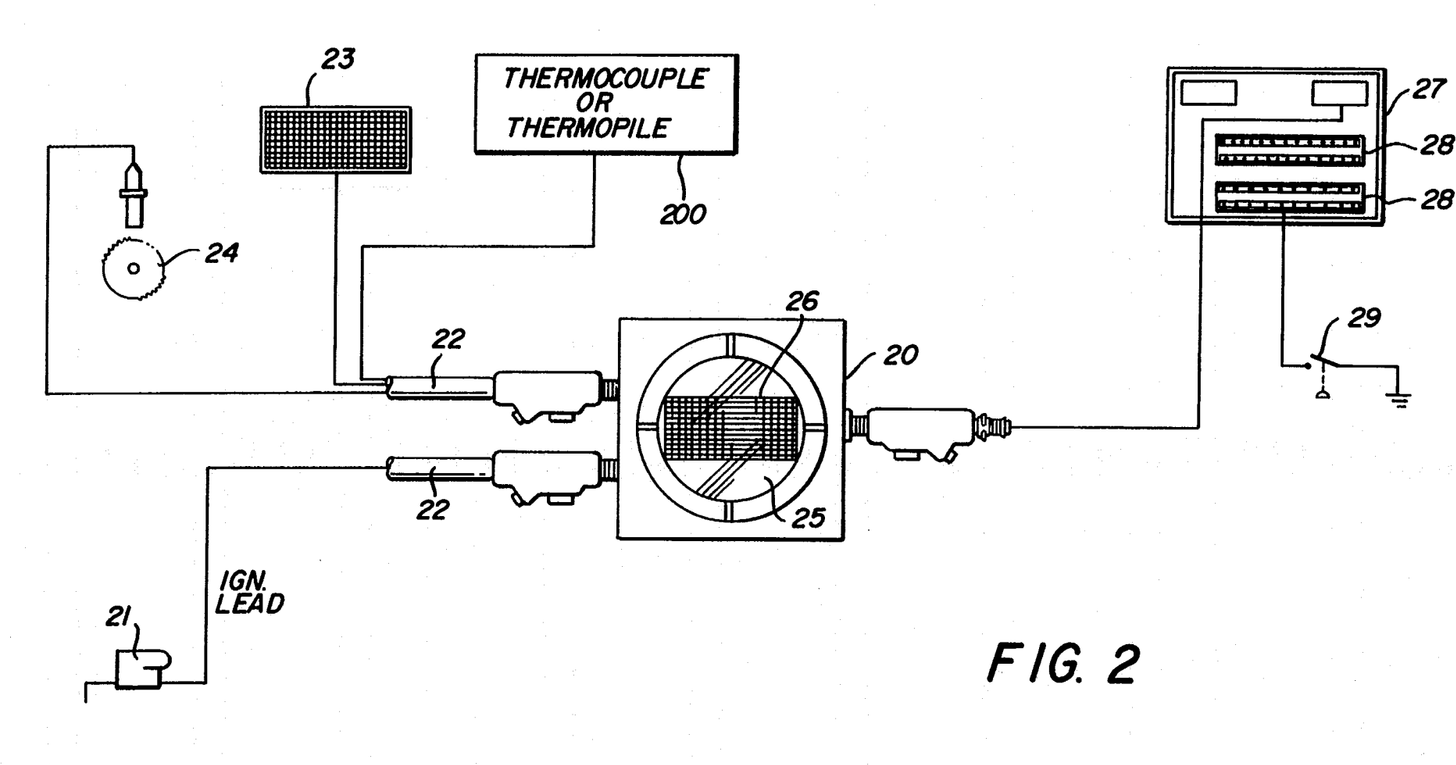
FIG. 2 shows a schematic diagram of the system according to the invention.

FIG. 2 shows a schematic diagram of the system. The system may be divided up into a power supply and shutdown unit 20 which may advantageously be contained in an explosion-proof junction box. According to the preferred embodiment, a power supply and shutdown unit may be connected to a thermocouple or thermopile 200, a remote power supply such as a remote photo cell 23, a thermocouple or thermopile 200 or an optional magnetic pickup 24. The power supply may also be connected to an auxiliary power supply such as a CD ignition system 21 of an internal combustion engine through a conduit 22. The ring gear of the magnetic pickup may advantageously be mounted on a rotating shaft of the internal combustion engine. The power supply and shutdown unit may advantageously include a window 25 to provide a light passageway for a first photovoltaic cell 26.

While the system is primarily designed for use as a shutdown and annunciator system for remotely located internal combustion engines, it will be appreciated by those of ordinary skill in the art that the system has far-reaching control system applications. For example, the system may be utilized as a security system for use in conjunction with commercial, residential or industrial fire and burglar alarms. The maintenance-free, independent and isolated power supply are particularly advantageous for these applications. A system also has applications for industrial process system monitoring such as may be necessary in factories, production lines, oil refineries or other chemical processing installations. A power supply and shut down unit is advantageously connected to an annunciator system 27. Annunciator system 27 includes a display and a plurality of sensor inputs 28. Each sensor input may be connected to a mechanically actuated sensor switch 29.

Figure 3:
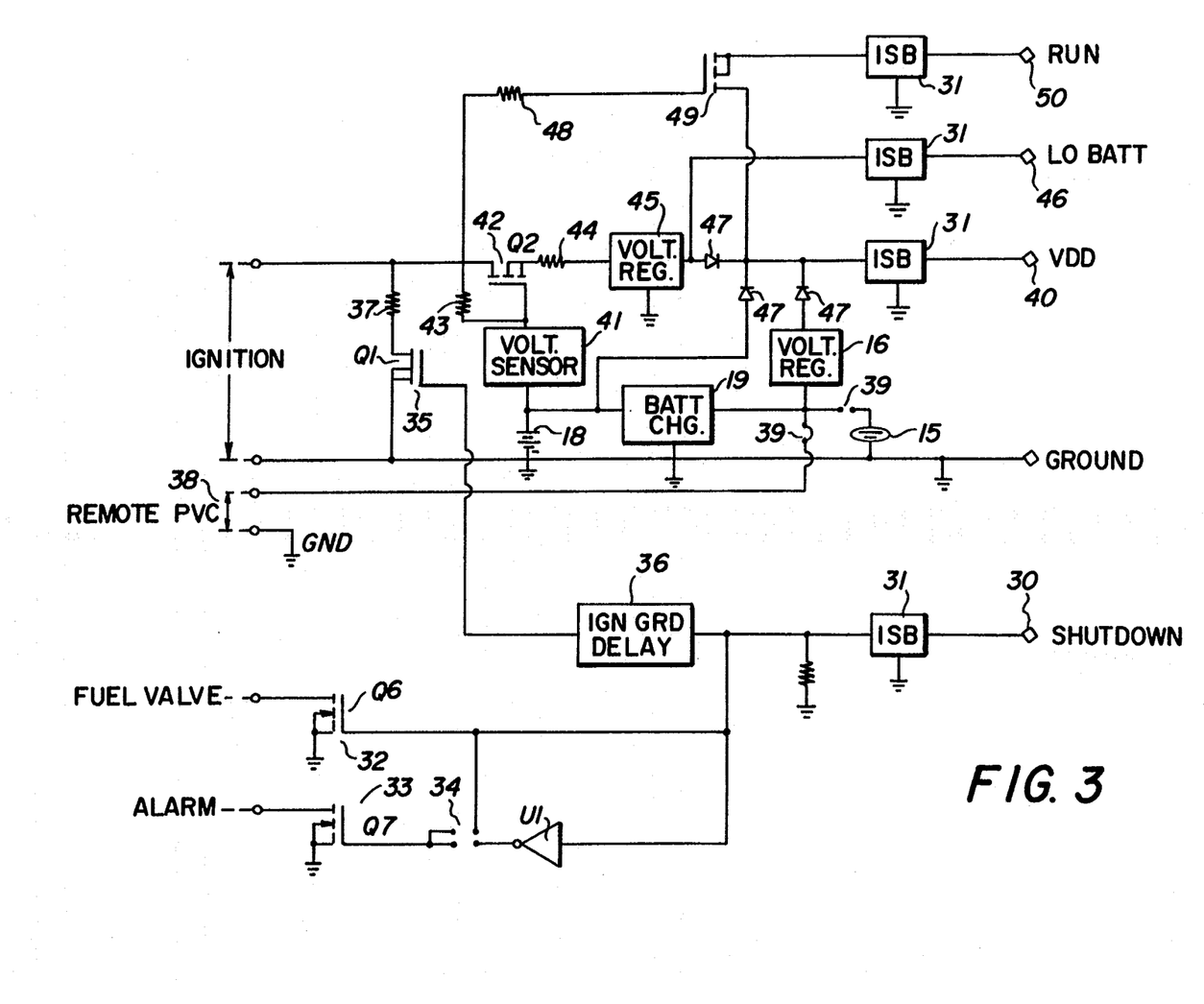
FIG. 3 shows a schematic diagram of the power supply and shutdown unit according to an embodiment of the invention.

FIG. 3 shows a power supply and shutdown unit. According to the preferred embodiment, a fault signal is delivered to the power supply shutdown system at terminal 30. This fault signal is transmitted through an intrinsically safe barrier 31 and is connected to the shutdown activators. According to the preferred embodiment, the shutdown activators include a fuel valve cutoff switch 32 and an alarm switch 33. Jumpers may be arranged at terminals 34 in order to either set the alarm signal switch on for a shutdown or off for a run indication. To accomplish this, an invertor U1 may be connected to one of the jumper terminals. In addition, an ignition ground switch 35 may be connected to the shutdown system through an ignition ground delay 36 to allow the opportunity to exhaust the fuel supply prior to engaging the ignition short. Ignition ground delay can be set for 3–5 seconds. An input to the ignition ground delay may be connected to resistor R12. The ignition ground switch 35 may be placed in series with a low resistance resistor 37. The resistance value of the resistor 37 may approximate 100 ohms. The ignition ground switch is advantageously connected across the ignition terminals to short out an internal combustion ignition. The power supply may include a primary power supply and an auxiliary power supply. According to the preferred embodiment, the primary power supply includes an on-board photo cell 15 for providing power to the annunciator, and a battery 18 and battery charger 19 connected to the photo cell 15 for providing backup power. The primary power supply may also be provided with a terminal 38 for a remote solar cell. Switches 39 are provided in order to establish connection to solar cells or cells whichever are installed. A voltage regulator 16 is provided to control a voltage level delivered to the annunciator through terminal 40.

The system may include a voltage sensor 41 which determines when the voltage supplied by the primary power supply drops below a predetermined level. Advantageously, this predetermined level may be set between 3.0 and 4.2 volts. Upon detection of a low-voltage condition, the sensor turns on switch 42 in parallel with resistor 43. The switch 42 controls the auxiliary power supply from the CD ignition system to the supply voltage terminal through a resister 44 and a second voltage regulator 45. Delivery of power through the voltage regulator 45 also provides a low battery signal at terminal 46. Diodes 47 are provided to isolate the various power sources. During operation of the internal combustion engine an ignition signal is delivered through resister 48 in order to turn on switch 49 and deliver a voltage level to the run signal terminal 50.

Figures 4, 4A:
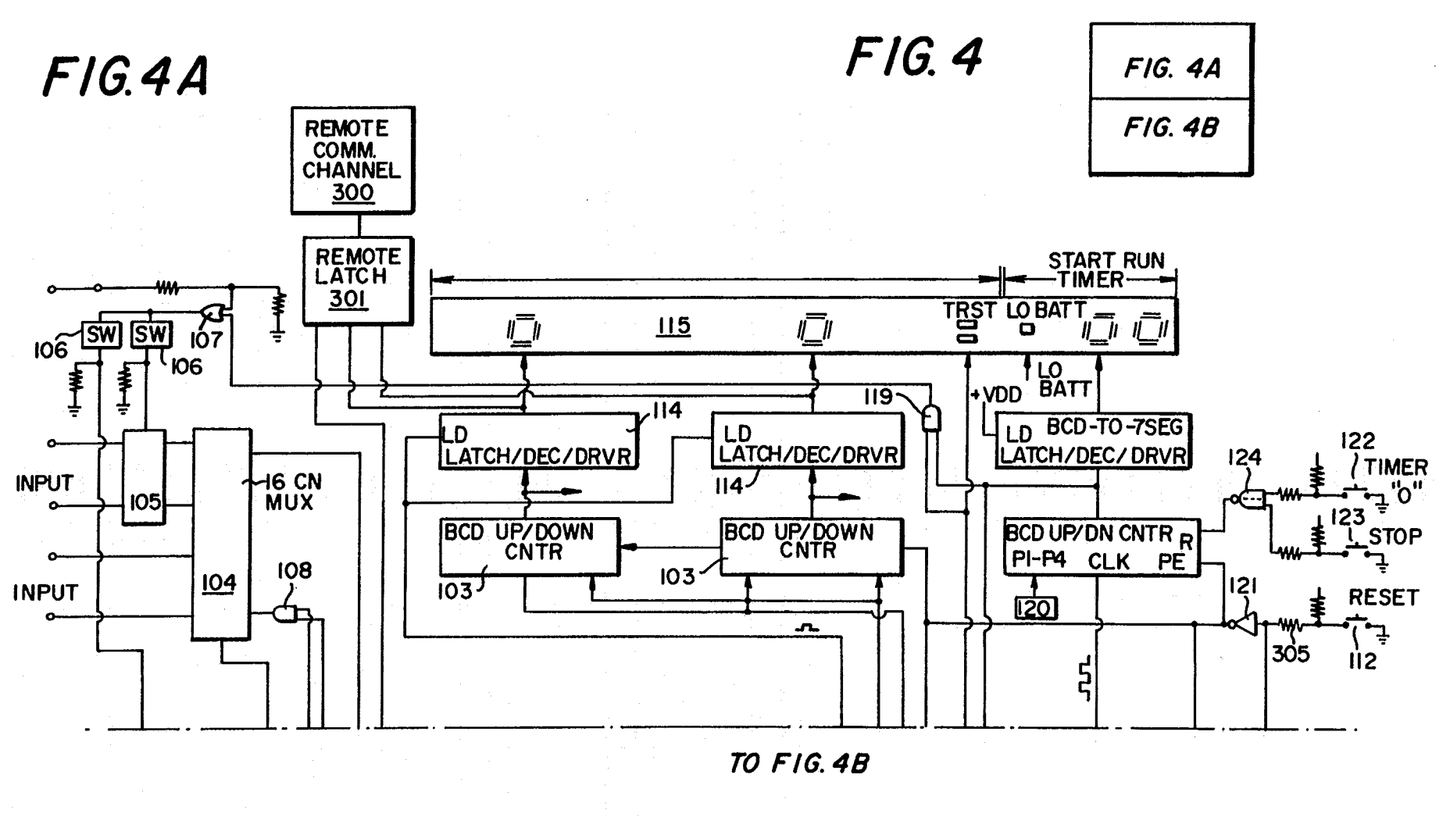
Figure 4B:
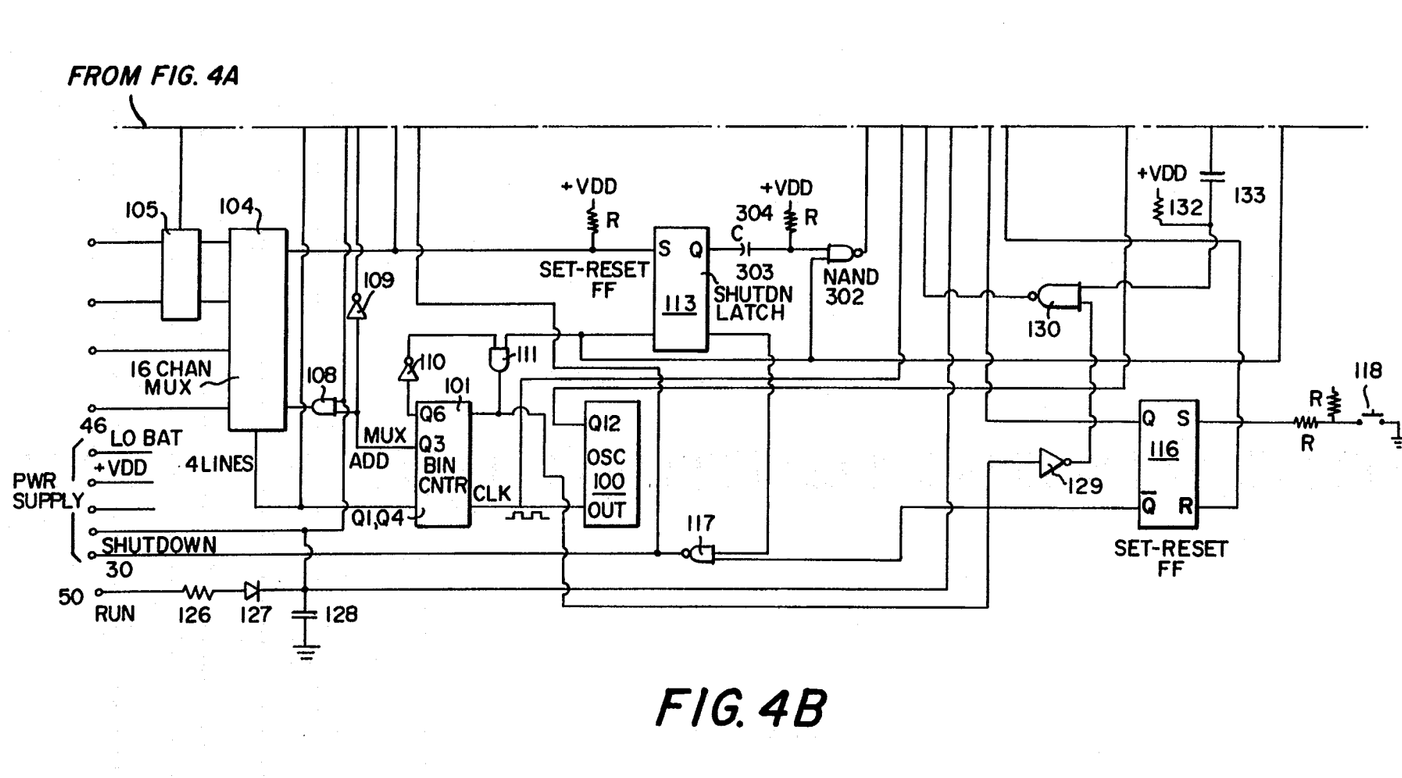

FIG. 4 shows the annunciator unit. An oscillator 100 provides a clock signal to a binary counter 101, a BCD Up/Down counter 102 and BCD display counters 103. The binary counter 101 delivers a signal to the sensor input multiplexers 104 which are in turn connected to the sensor inputs. Some of the sensor inputs are connected to the multiplexer through analog switches 105 which are controlled through 8 pole DIP switches 106. A remote timer start input is connected to a first input of a logic gate 107. The logic gate output is provided to the 8 pole DIP switches 106 which in turn control which sensor inputs are "hot-wired" and which inputs will be disabled by the timer by virtue of the 8 channel analog switches 105 at start-up.

When the system is implemented with two 16 channel multiplexers 104, the first four lines from the counter are connected to the multiplexer address lines and a sensor scan enable signal is connected through AND gates 108 to the multiplexer inhibit inputs. The fifth line of the counter is connected directly to the AND gate 108 of the first multiplexer and through an invertor 109 to the AND gate 108 associated with the second multiplexer. One of the counter outputs is also inverted at invertor 110 and connected to a NAND gate 111 input. The other NAND gate input is the reset signal derived from the reset push button 112. The output of the NAND gate 111 provides the reset signal for counter 101 and is connected to the input of inverter 129. The inverter 129 output provides an input to NAND gate 130. The second input to NAND gate 130 is derived from the RESET pushbutton 112 circuit through a resistive network 305, inverter 121 and an RC circuit 132, 133. The output of NAND gate 130 is connected to the counter preset inputs (PE) of the BCD display counters 103. The oscillator 100 also provides the clock input to the BCD display counters 103. When a fault condition is detected, it will set the shutdown latch 113 whose output will cause the sensor number count of BCD display counters 103 to be stored into the BCD to 7 segment display latch/decoder/drivers 114. An output of the shutdown latch 113 may be connected to an input of a NAND gate 302 through a one-shot circuit made up of a capacitor 303 and a resistor 304. A second input of the NAND gate 302 may be connected to the reset signal through the RESET pushbutton 112 and the resistive network 305. An output of the gate 302 may be connected to the "LD" or load inputs of the BCD to 7 segment display latch/decoder/drivers 114. The output of the drivers 114 is connected to the LCD display 115. An inverted output of the shutdown latch 113 is gated with an inverted output of the test latch 116 by gate 117. The output of the gate 117 is the shutdown signal output 30 which is connected to the power supply unit. A test button 118 is provided which sets the test latch 116. An output of the test latch is connected to the test display of the LCD display 115 and is gated through AND gate 119 to the 8 pole DIP switch gate 107. The test latch 116 is reset by the BCD Up/Down counter 102 output. A four pole range select DIP switch 120 is connected to the BCD Up/Down counter 102. The reset pushbutton is connected through invertor 121 to the BCD Up/Down counter 102 PE input and the BCD Up/Down counters 103 rest input. Timer "0" pushbutton 122 and stop pushbutton 123 are connected through a NAND gate 124 to the BCD Up/Down counter 102 reset terminal. The count output of the Up/Down counter 102 is connected to a BCD to 7 segment latch/decoder/driver 125 which drives the start run timer portion of the LCD display 115. The PE input of the BCD Up/Down counter 102 will load the count range set by the range select four pole DIP switch 120. The clock input to the BCD Up/Down counter 102 is provided by the oscillator 100. The counter will then count down and the time remaining will be displayed by the start run timer portion of the LCD display 115.

As described above, the preferred embodiment utilizes a binary counter to scan the sensor inputs and a BCD counter which tracks the scanned input sensor identification. Upon detection of a fault, the BCD counter output is latched into the identification storage latches 114 and displayed on the LCD display. According to an alternative embodiment, a single counter may be utilized to scan the channels and upon detection of the fault; the scanner input identification from the counter may be stored in a latch. The latch output may then be decoded for driving an LCD or other display. According to a further alternative embodiment the entire annunciator unit may be implemented with a general purpose microprocessor based system.

The LCD display may include a low battery display section responsive to the low battery output 46 of the power supply unit. The annunciator section may be provided with the run signal input 50 connected to a resistor 126 and a Diode 127. The diode output may advantageously be connected to the sensor scan enable input and the output of invertor 121. Furthermore, a capacitor 128 may be connected between an output of diode 127 and ground. This configuration allows a complete prestart scan of the sensor channels.

The BCD to seven segment latches 114 may be connected to an optional remote port 300 through a latch 301. Advantageously, the remote communication channel 300 is also connected through the latch 301 to the fault signal shutdown terminal 30.

The preferred embodiment is described by way of illustration. The description of the preferred embodiment is not intended to limit the scope of the claims. One of ordinary skill in the art would recognize that various modifications to the described preferred embodiment may be made without departing from the spirit and scope of the invention.

I claim:

1. An actuator and annunciator comprising:
   a fault detection unit responsive to a plurality of fault condition sensor inputs;
   a fault condition identification storage element connected to said fault detection unit;
   a display connected to said fault condition identification storage element;
   a photoelectric power supply connected to said fault condition identification storage element;
   a backup power supply source connected to said photoelectric power supply wherein said backup power supply includes a battery and a battery charger connected to said battery and to said photoelectric power supply;
   a voltage sensor connected to said backup power supply source;
   an auxiliary power supply connected to said fault condition identification storage element;
   a switch, controlled by said voltage sensor, connected between said auxiliary power supply and said fault condition identification storage element, wherein said switch and said voltage sensor are configured to disconnect said auxiliary power supply from said fault condition identification storage element when a voltage of said backup power supply exceeds a pre-determined level and to connect said auxiliary power supply when said voltage falls below said pre-determined level; and
   means for isolating said auxiliary power supply from said photoelectric power supply and said backup power supply to allow the photoelectric power supply to charge the battery and preventing the auxiliary power supply from charging the battery.

2. An actuator and annunciator according to claim 1, further comprising:
   an activator responsive to said fault detection unit.

3. An actuator and annunciator according to claim 2, wherein said photoelectric power supply comprises:
   a photoelectric generator; and
   wherein said backup power supply source is connected to said photoelectric generator.

4. An actuator trigger and annunciator according to claim 1, further comprising a housing and wherein said photoelectric generator and said activator are located in said housing.

5. An actuator and annunciator according to claim 1, further comprising a remote power supply connected to said photoelectric power supply, wherein said remote power supply is a second photoelectric generator.

6. An actuator and annunciator according to claim 1, further comprising a remote power supply connected to said photoelectric power supply wherein said remote power supply is a magnetic pickup power supply.

7. An actuator and annunciator according to claim 1, further comprising a remote power supply connected to said photoelectric power supply wherein said remote power supply is a thermocouple.

8. An actuator and annunciator according to claim 1, further comprising a remote power supply connected to said photoelectric power supply wherein said remote power supply is a thermopile.

9. An actuator trigger and annunciator according to claim 1, wherein said auxiliary power supply comprises an internal combustion engine ignition power supply.

10. An actuator trigger and annunciator according to claim 5, wherein said photoelectric power supply further comprises a voltage regulator.

11. An actuator trigger and annunciator according to claim 5, wherein said activator comprises a fuel supply cut-off activator.

12. An actuator trigger and annunciator according to claim 11, wherein said activator further comprises an activation delay device and an engine ignition shut-off switch connected to said delay device.

13. An actuator trigger and annunciator according to claim 5, wherein said activator is connected to a remote communication channel.

14. An actuator trigger and annunciator according to claim 13, wherein said remote communication channel is connected to said fault condition identification storage element.

15. A shutdown trigger and annunciator according to claim 1, wherein said fault detection unit comprises:
   a binary counter exhibiting a clock input connected to a clock generator;
   a multiple channel multiplexer connected to said plurality of fault condition sensor inputs and having channel selection inputs connected to said counter;
   a BCD counter connected to said clock generator; and
   a first latch connected to an output of said BCD counter and triggered by a signal obtained from said multiplexer.

16. A shutdown trigger and annunciator according to claim 15, further comprising:
   a second latch connected to an output of said multiplexer;
   a one-shot circuit connected to an output of said multiplexer and a load input of said first latch.

17. An actuator trigger and annunciator according to claim 16, further comprising:
   a plurality of digitally controlled analog switches connected to said sensor inputs of said multiplexer; and
   a disable signal generator connected to control inputs of said analog switches.

18. An actuator trigger and annunciator according to claim 17, further comprising:
   a channel selection circuit connected between said disable signal generator and said control inputs.

19. An actuator trigger and annunciator according to claim 18, wherein said disable signal generator is a start-/run timer.

20. An actuator trigger and annunciator according to claim 19, wherein said disable signal generator further comprises an annunciator test circuit.

21. An actuator and annunciator according to claim 1, wherein said means for isolating includes a plurality of diodes.

* * * * *